(12) United States Patent
Halstead et al.

(10) Patent No.: US 7,233,876 B2
(45) Date of Patent: Jun. 19, 2007

(54) DATA ACQUISITION SYSTEM PROVIDING DUAL MONITORING OF SENSOR DATA

(75) Inventors: Eric Halstead, Beauport (CA); Yves-André Thériault, Beauport (CA)

(73) Assignee: Steris Inc., Temecula, CA (US)

( * ) Notice: Subject to any disclaimer, the term of this patent is extended or adjusted under 35 U.S.C. 154(b) by 660 days.

(21) Appl. No.: 10/728,672

(22) Filed: Dec. 5, 2003

(65) Prior Publication Data

US 2005/0125105 A1 Jun. 9, 2005

(51) Int. Cl.
*G06F 15/00* (2006.01)
(52) U.S. Cl. .................. 702/130; 702/138; 702/156
(58) Field of Classification Search .................. 702/47, 702/98, 99, 127, 133, 138, 156, 130; 700/299
See application file for complete search history.

(56) References Cited

U.S. PATENT DOCUMENTS 5,965,819 A * 10/1999 Piety et al. .................... 73/660

2004/0128099 A1 * 7/2004 Summers et al. ........... 702/130

* cited by examiner

*Primary Examiner*—John Barlow
*Assistant Examiner*—Douglas N Washburn
(74) *Attorney, Agent, or Firm*—Kusner & Jaffe; Michael A. Centanni

(57) ABSTRACT

A system for data acquisition providing dual monitoring of sensor data. Data is acquired from sensing devices by a primary data acquisition circuit and a secondary data acquisition circuit. Multiple sensors are used to sense a condition of the same operating parameters, in order to verify a process condition. Data acquired by first and second sensing devices are respectively processed by the primary and secondary data acquisition circuits. According to one aspect of the present invention, a process condition is verified by comparing data associated with the first sensing device and data associated with the second sensing device. In accordance with another aspect of the present invention data acquired by a single sensing device may be processed through both the primary data acquisition circuit and the secondary data acquisition circuit, in order to verify operation of the primary and secondary data acquisition circuits.

19 Claims, 1 Drawing Sheet

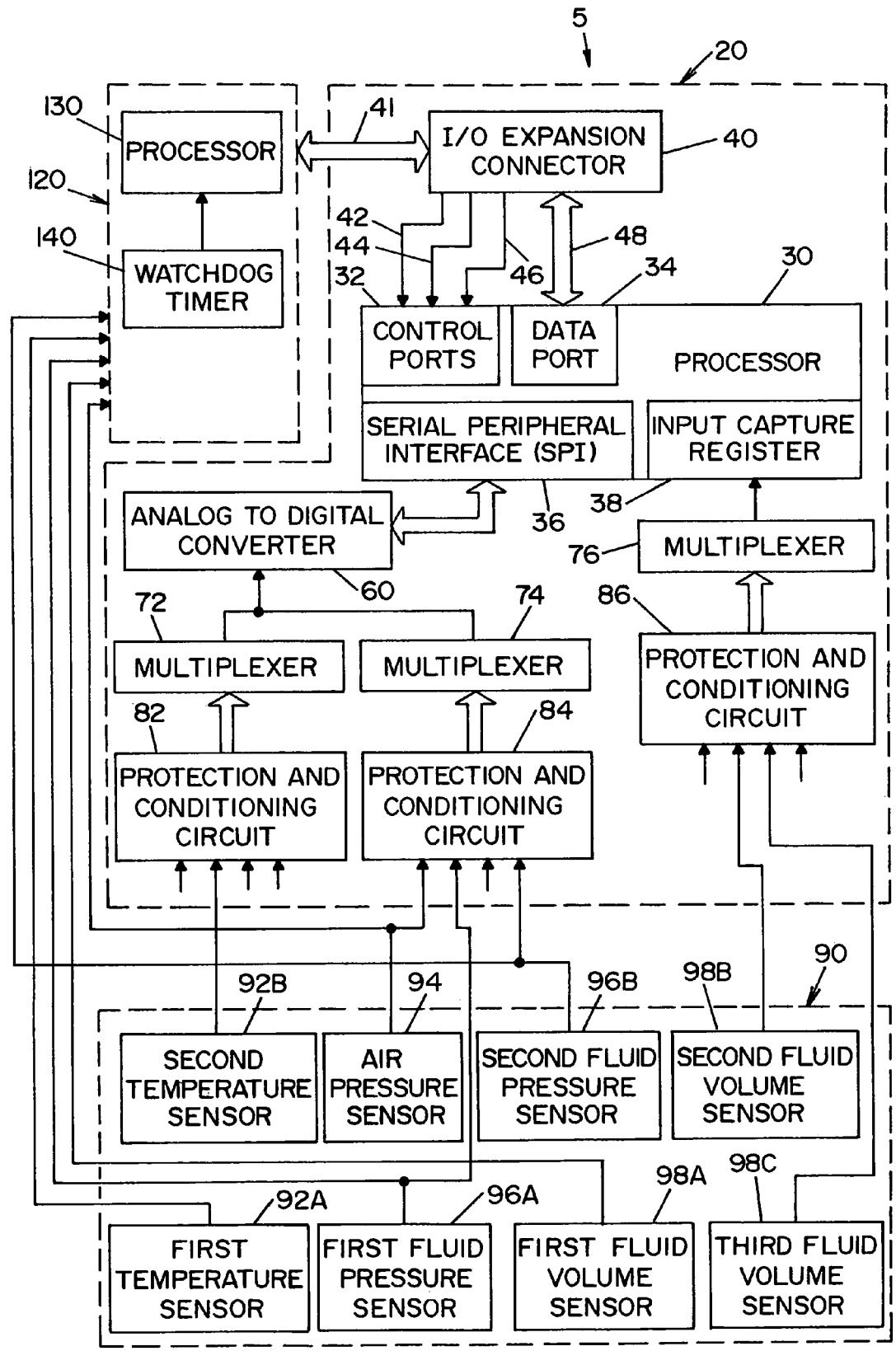

DATA ACQUISITION SYSTEM PROVIDING DUAL MONITORING OF SENSOR DATA

FIELD OF THE INVENTION

The present invention relates to a system for data acquisition, and more particularly to a system for data acquisition providing dual monitoring of sensor data.

BACKGROUND OF THE INVENTION

In some applications, certain process conditions must be verified during system operation. These process conditions typically relate to critical system operating parameters that must meet or exceed a specified standard. In some cases, the verification of process conditions is mandated by regulation.

Fluid microbial decontamination systems (e.g., a washer disinfector) are typically designed to cause microbes on an article to be removed or killed by a fluid anti-microbial agent. This is achieved in a variety of ways, including, but not limited to, bathing the article in an anti-microbial liquid, spraying the article with an anti-microbial liquid, surrounding the article with an anti-microbial vapor, and the like. The articles subject to treatment are typically re-usable devices used in connection with medical, dental, pharmaceutical and veterinary practices.

One type of fluid microbial decontamination system is an automated endoscope processor used for cleaning and disinfection or sterilization of lumened devices, such as described in U.S. patent application Ser. No. 10/115,847 filed Apr. 4, 2002, and U.S. patent application Ser. No. 10/116,393 filed Apr. 4, 2002, both fully incorporated herein by reference.

In a fluid microbial decontamination system it may be necessary to verify process conditions relating to such items including, but not limited to, fluid pressure, fluid temperature, and fluid volume. Accordingly, there is a need to provide a microbial decontamination system with a data acquisition system for verifying critical process conditions.

The present invention provides a system for data acquisition that includes dual monitoring of sensor data for process verification.

SUMMARY OF THE INVENTION

In accordance with the present invention, there is provided a data acquisition system for monitoring of sensor data, comprising: (a) a primary data acquisition circuit for receiving signals from at least a first sensing device, including: first processing means for processing data received from said first sensing device, and (b) a secondary data acquisition circuit for receiving data from at least a second sensing device, wherein said first sensing device and said second sensing device provide data indicative of a condition of the same operating parameter, said secondary data acquisition circuit including: second processing means for processing data received from said second sensing device, and an analog-to-digital conversion means for converting analog data to digital data, said secondary data acquisition circuit electrically connected with said primary data acquisition circuit.

In accordance with another aspect of the present invention, there is provided a data acquisition system for monitoring of sensor data, comprising: (a) a primary data acquisition circuit for receiving signals from a sensing device, including: first processing means for processing data received from said sensing device, and (b) a secondary data acquisition circuit for receiving data from said sensing device, wherein said sensing device provides data indicative of a condition of an operating parameter, said secondary data acquisition circuit including: second processing means for processing data received from said sensing device, and an analog-to-digital conversion means for converting analog data to digital data, said secondary data acquisition circuit electrically connected with said primary data acquisition circuit.

An advantage of the present invention is the provision of a dual monitoring data acquisition system that is inexpensive to implement.

A still further advantage of the present invention is the provision of a dual monitoring data acquisition system that is easy to operate.

Yet another advantage of the present invention is the provision of a dual monitoring data acquisition system with minimal physical space requirements.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 1 is a block diagram of a data acquisition system, according to a preferred embodiment of the present invention.

DETAILED DESCRIPTION OF A PREFERRED EMBODIMENT

While a preferred embodiment of the present invention will be described herein in connection with a fluid microbial decontamination system as disclosed in the above-referenced patent applications, it is contemplated that the present invention finds utility with any microbial decontamination system wherein process verification is required. In this regard, the fluid microbial decontamination system described herein is merely exemplary, and is not intended to limited the scope of the present invention.

The fluid microbial decontamination system described in the above-referenced patent applications (i.e., U.S. patent application Ser. No. 10/115,847 and U.S. patent application Ser. No. 10/116,393) include a main treatment chamber, at least one housing defining a cavity dimensioned to receive at least one endoscope head, a heater, and a micro porous filter.

Fluid (e.g., water and disinfectant solution) is forced through the cavity to wash or disinfect the endoscope head(s) located inside the cavity. Fluid is supplied to the housing at a sufficient pressure to maintain a pressure inside the housing that is below that which could cause damage to delicate components of the endoscope, but is sufficient to force the fluid to penetrate through the lumens of the endoscope. To ensure that the pressure within the housing is maintained within a predetermined range, a pressure sensor is provided to detect pressure within the housing. If the detected pressure falls below a minimum predetermined pressure or rises above a maximum predetermined pressure, a control system may respond in one or more ways, including, but not limited to: (a) actuate an alarm, (b) abort an operating cycle, (c) effect an increase or decrease in the pressure to obtain a pressure within an acceptable range, and (d) limit or increase the volume of liquid entering the housing in accordance with the detected pressure. Furthermore, it should be appreciated that volume sensors may be used to monitor the volume of fluid entering the housing.

The heater heats circulating fluid to a desired temperature for effective cleaning or disinfection. The temperature of the circulating fluid is monitored to determine whether the temperature of the circulating fluid is in a range for effective treatment.

The micro porous filter is located in a water inlet line, and filters particles of dirt and microorganisms out of the incoming water supply. The integrity of the filter is checked during a filter integrity test, wherein a chamber of the filter is pressurized to a predetermined pressure, and the pressure decay resulting from gas diffusion through a filter element is monitored.

Referring now to the drawings wherein the showings are for the purposes of illustrating a preferred embodiment of the invention only and not for purposes of limiting same, FIG. 1 shows a data acquisition system 5, according to a preferred embodiment of the present invention. In the illustrated embodiment, data acquisition system 5 includes a primary data acquisition circuit 120, a secondary data acquisition circuit 20, and sensing devices 90.

Primary data acquisition circuit 120 includes a processor 130, as well as other circuit components (not shown) for controlling a fluid microbial decontamination system. In this regard, primary data acquisition circuit 120 also serves as the control unit of the microbial decontamination system. Processor 130 preferably takes the form of a microcontroller or microprocessor. For example, processor 130 may take the form of an 80c188EB embedded processor from Intel Corporation. Primary data acquisition circuit 120 also includes an analog-to-digital converter (ADC). The ADC may be on-board processor 130, or alternatively, may be a provided as a separate ADC circuit. In the illustrated embodiment, the ADC is on-board processor 130.

Primary data acquisition circuit 120 preferably includes a watchdog timer (WDT) circuit 140 for preventing system crashes. Watchdog timer circuit 140 may be integrated in processor 130, or alternatively take the form of a discrete circuit. As well known to those skilled in the art, WDT circuit 140 will transmit a signal if processor 130 enters a malfunction state, and does not recover from the malfunction state on its own, after a certain period of time has elapsed. In this respect, WDT circuit 140 includes a counter that counts down to zero at a constant speed from a preset number. If the counter reaches zero before processor 130 recovers from the malfunction state, WDT circuit 140 transmits a signal to perform a desired "recovery" action.

In the illustrated embodiment, the components of primary data acquisition circuit 120 and the components of secondary data acquisition circuit 20 are located on separate circuit boards. A separate circuit board for secondary data acquisition circuit 20 allows existing data acquisition systems to be easily configured to include secondary acquisition circuit 20, without modifications to the circuit board used for primary data acquisition circuit 120. Alternatively, it is contemplated that the components of primary data acquisition circuit 120 and secondary data acquisition circuit 20 could be combined on a single circuit board.

Secondary data acquisition circuit 20 is generally comprised of a processor 30, an I/O expansion connector 40, an analog-to-digital converter (ADC) 60, a plurality of multiplexers 72, 74 and 76, and a plurality of protection/conditioning circuits 82, 84 and 86.

Processor 30 preferably takes the form of a microcontroller or microprocessor. In the illustrated embodiment, processor 30 takes the form of a CMOS FLASH-based 8-bit microcontroller, part number PIC18F452, from Microchip Technology Inc. Processor 30 includes control ports 32, a data port 34, a serial peripheral interface (SPI) 36, and an input capture register 38. Control ports 32 receive control signals for controlling operation of processor 30. Data port 34 inputs and outputs parallel data. In a preferred embodiment, data port 34 can input and output 8 bits of parallel data. Serial peripheral interface 36 provides a serial data input and output port, as well known to those skilled in the art.

I/O expansion connector 40 facilitates electrical connection of primary data acquisition circuit 120 to secondary data acquisition circuit 20. In the illustrated embodiment, I/O expansion connector 40 takes the form of a modular interconnection device comprised of receptacle contacts and mating posts, such as AMP part number 1-103166-6.

I/O expansion connector 40 is electrically connected with processor 30 via a select control line 42, a read control line 44, a write control line 46, and a multi-bit data line 48. Lines 42, 44 and 46 interface with control ports 32. Data line 48 interfaces with data port 34. Select control line 42 is used to transmit a signal for selecting a register in processor 30. Read control line 44 is used to transmit a signal for controlling processor 30 to read data from a selected register or memory location, and write control line 46 is used to transmit a signal for controlling processor 30 to write data to a selected register or memory location. Data line 48 carries data signals between I/O expansion connector 40 and processor 30.

A data transfer line 41 electrically connects I/O expansion connector 40 with primary data acquisition circuit 120. Data transfer line 41 may take the form of a conventional ribbon cable.

ADC 60 converts input data from analog form to digital form. Preferably, ADC 60 is a 16-bit converter, thus providing 16-bit digital output data. It should be appreciated that ADC 60 may alternatively take the form of an ADC integrated in processor 130.

Multiplexers 72, 74 and 76 are conventional analog multiplexers that enable a plurality of signals to share a single circuit path.

Protection and conditioning circuits 82, 84, and 86 are conventional circuits for protecting secondary data acquisition circuit 20 from electrostatic discharge and the like, and conditioning the data signals received from sensing devices 90, discussed in detail below. The data signals may be conditioned by appropriate scaling or limiting of voltages.

It should be appreciated that primary data acquisition circuit 120 may also include an ADC, multiplexers, and protection and conditioning circuits that are similar, or the same, as those described above in connection with secondary data acquisition circuit 20.

Sensing devices 90 include a first temperature sensor 92A, a second temperature sensor 92B, an air pressure sensor 94, a first fluid pressure sensor 96A and a second fluid pressure sensor 96B, a first fluid volume sensor 98A, a second fluid volume sensor 98B, and a third fluid volume sensor 98C. Each sensing device provides data indicative of a condition of an operating parameter.

First and second temperature sensors 92A and 92B preferably include a resistance temperature detector (RTD). An RTD has a resistance value that varies with a sensed temperature. First and second temperature sensor 92A and 92B each output an analog signal indicative of the temperature of the fluid (e.g., water and disinfectant solution) circulating in the microbial decontamination system. It should be understood that second temperature sensor 92B is redundant, and thus acts to verify proper operation of first temperature sensor 92A. First temperature sensor 92A is electrically connected with primary data acquisition circuit 120, while second temperature sensor 92B is electrically connected with secondary data acquisition circuit 20.

Air pressure sensor 94 preferably includes a pressure transducer. Air pressure sensor 94 outputs an analog signal indicative of the pressure inside a filter during a filter integrity test, as described above. The sensed pressure is indicative of the integrity of the filter. Air pressure sensor 94 is electrically connected with both primary and secondary data acquisition circuits 20, 120.

First and second fluid pressure sensors 96A and 96B are preferably located at respective housings for an endoscope head. Each fluid pressure sensor 96A, 96B preferably includes a pressure transducer. In the illustrated embodiment, each fluid pressure sensor 96A, 96B outputs an analog signal indicative of the fluid pressure in the respective housing. Fluid pressure sensors 96A and 96B are both electrically connected with primary data acquisition circuit 120 and secondary acquisition circuit 20.

First fluid volume sensor 98A outputs data to primary data acquisition circuit 120 that is indicative of the volume of fluid inside the treatment chamber of the microbial decontamination system. In a preferred embodiment, first fluid volume sensor 98A takes the form of a conventional fluid level sensor that outputs an analog signal indicative of fluid level. For example, fluid volume sensor 98A may take the form of fluid level sensor part number M5002-7005 from MADISON. First fluid volume sensor 98A is electrically connected with primary data acquisition circuit 120. Processor 130 of primary data acquisition circuit 120 determines a fluid volume corresponding to the sensed fluid level. First fluid volume sensor 98A preferably senses a water volume inside the treatment chamber.

Second fluid volume sensor 98B outputs data to secondary data acquisition circuit 20 that is indicative of the volume of fluid inside the treatment chamber of the microbial decontamination system. In a preferred embodiment, second fluid volume sensor 98B takes the form of a conventional flowmeter that outputs a digital signal. For example, second fluid volume sensor 98B may take the form of flowmeter part number #FHK-20 from DIGMESA. The flowmeter outputs a digital pulse indicative of a fluid flow rate (i.e., flow quantity per unit time). Processor 30 of second data acquisition circuit 20 counts the digital pulses received per unit time to determine a digital value indicative of the fluid volume. Second fluid volume sensor 98B preferably senses a water volume inside the treatment chamber.

Third fluid volume sensor 98C also outputs data to secondary data acquisition circuit 20 that is indicative of the volume of fluid inside the treatment chamber of the microbial decontamination system. In a preferred embodiment, third fluid volume sensor 98C takes the form of a conventional flowmeter that outputs a digital signal. For example, third fluid volume sensor 98C may take the form of flowmeter part number FHKUG1/4 from DIGMESA. The flowmeter outputs a digital pulse indicative of a fluid flow rate (i.e., flow quantity per unit time). Processor 30 of second data acquisition circuit 20 counts the digital pulses received per unit time, to determine a digital value indicative of the fluid volume. Third fluid volume sensor 98B preferably senses a detergent solution volume inside the treatment chamber.

Operation of data acquisition system 5 will now be described in detail. During operation of the microbial decontamination system, fluid pressure, fluid temperature, air pressure and fluid volume are monitored by sensing devices 90. By way of example and not limitation, the fluid may be water, a cleaning solution including a detergent, or a disinfection solution, including, but not limited to, a peracetic acid solution, a hydrogen peroxide solution, and an enzymatic solution.

With regard to fluid temperature, first temperature sensor 92A provides a first analog signal to primary data acquisition circuit 120 indicative of the temperature of fluid circulating in the microbial decontamination system. The first analog signal received by primary data acquisition circuit 120 is converted to a corresponding first digital value.

Second temperature sensor 92B provides a second analog signal to secondary data acquisition circuit 20 also indicative of the temperature of fluid circulating in the microbial decontamination system. The second analog signal passes through protection and conditioning circuit 82 and multiplexer 72. ADC 60 converts the second analog signal to a corresponding second digital value, preferably a 16-bit digital value. Processor 30 reads the second digital value via serial peripheral interface 36. The second digital value is read out of processor 30 via data port 24 as parallel data (8-bit or 16-bit) and transmitted to primary data acquisition circuit 120 via data line 48, I/O expansion connector 40, and data transfer line 41.

Processor 130 compares the first and second digital values to verify operation of the first and second temperature sensors 92A, 92B. In this regard, if the first and second values have a difference exceeding a predetermined threshold, it is determined that at least one of the first and second temperature sensors 92A, 92B is faulty. Accordingly, appropriate corrective action can be taken by primary data acquisition system 120, and/or warning signals can be generated to alert an operator to the faulty sensing device.

The integrity of a filter is determined by use of air pressure sensor 94, as discussed above. It should be appreciated that air pressure sensor 94 does not have an associated redundant air pressure sensor. Air pressure sensor 94 provides an analog signal to primary data acquisition circuit 120 indicative of the pressure sensed inside the filter, during a filter integrity check. The first analog signal received by primary data acquisition circuit 120 is converted to a corresponding first digital value.

Air pressure sensor 94 also provides the analog signal to secondary data acquisition circuit 20 indicative of the pressure sensed inside the filter, during the filter integrity check. The analog signal passes through protection and conditioning circuit 84 and multiplexer 74. ADC 60 converts the analog signal to a corresponding second digital value, preferably a 16-bit digital value. Processor 30 reads the second digital value via serial peripheral interface 36. The second digital value is read out of processor 30 as parallel data (e.g., 8-bit or 16-bit), via data port 24, and transmitted to primary data acquisition circuit 120 via data line 48, I/O expansion connector 40, and data transfer line 41.

Processor 130 compares the first and second digital values to verify operation of primary and secondary data acquisition circuits 120, 20. In this regard, if the first and second values have a difference exceeding a predetermined threshold, it is determined that at least one of the primary and secondary data acquisition circuits 120, 20 is faulty. Accordingly, appropriate corrective action can be taken by primary data acquisition system 120, and/or warning signals can be generated to alert an operator to the malfunction condition.

With regard to fluid pressure, first fluid pressure sensor 96A provides an analog signal to primary data acquisition circuit 120 and secondary data acquisition circuit 20 indicative of the fluid pressure at a first housing for a first endoscope head. The analog signal received by primary data acquisition circuit 120 is converted to a corresponding first digital value. The analog signal received by secondary data acquisition circuit 120 passes through protection and conditioning circuit 84 and multiplexer 74. ADC 60 converts the analog signal to a corresponding second digital value, preferably a 16-bit digital value. Processor 30 reads the second digital value via serial peripheral interface 36. The second digital value is read out of processor 30 as parallel data (e.g., 8-bit or 16-bit) via data port 24 and transmitted to primary data acquisition circuit 120 via data line 48, I/O expansion connector 40, and data transfer line 41.

Processor 130 compares the first and second digital values associated with first fluid pressure sensor 96A, to verify operation of primary and secondary data acquisition circuits 120, 20. In this regard, if the first and second values have a difference exceeding a predetermined threshold, it is determined that at least one of the primary and secondary data acquisition circuits 120, 20 is faulty. Accordingly, appropriate corrective action can be taken by primary data acquisition system 120, and/or warning signals can be generated to alert an operator to the malfunction condition.

Second fluid pressure sensor 96B also provides an analog signal to primary data acquisition circuit 120 and secondary data acquisition circuit 20 indicative of the fluid pressure at a second housing for a second endoscope head. The analog signal received by primary data acquisition circuit 120 is converted to a corresponding first digital value. The analog signal received by secondary data acquisition circuit 20 passes through protection and conditioning circuit 84 and multiplexer 74. ADC 60 converts the analog signal to a corresponding second digital value, preferably a 16-bit digital value. Processor 30 reads the second digital value via serial peripheral interface 36. The second digital value is read out of processor 30 as parallel data (e.g., 8-bit or 16-bit) via data port 24 and transmitted to primary data acquisition circuit 120 via data line 48, I/O expansion connector 40, and data transfer line 41.

Processor 130 compares the first and second digital values associated with second fluid pressure sensor 96B, to verify operation of primary and secondary data acquisition circuits 120, 20. In this regard, if the first and second values have a difference exceeding a predetermined threshold, it is determined that at least one of the primary and secondary data acquisition circuits 120, 20 is faulty. Accordingly, appropriate corrective action can be taken by primary data acquisition system 120, and/or warning signals can be generated to alert an operator to the malfunction condition.

Processor 130 compares the first and second digital values to verify operation of the first and second fluid pressure sensors 96B. This sensor has an input on both primary data acquisition circuit 120 and secondary data acquisition circuit 20. In this regard, if the first and second values have a difference exceeding a predetermined threshold, it is determined that at least one of the first and second read value on pressure sensors 96A is faulty. Accordingly, appropriate corrective action can be taken by primary data acquisition system 120, and/or warning signals can be generated to alert an operator to the faulty sensing device.

With regard to fluid volume, first fluid volume sensor 98A is preferably a float level sensor. The float level sensor provides a first digital value to primary data acquisition circuit 120 indicative of the level of a fluid (i.e., water) at a first location. Processor 130 determines a first fluid volume value corresponding to the first digital value indicative of the fluid level.

Second fluid volume sensor 98B is preferably a flowmeter sensor. The flowmeter sensor provides a digital pulse signal to secondary data acquisition circuit 20 that is indicative of the flow rate of a fluid (i.e., water) at the first location. The digital pulse signal passes through protection and conditioning circuit 86 and multiplexer 76 to input capture register 38. Processor 30 counts the received digital pulses indicative to determine a digital flow rate value. The computed digital flow rate value is read out of processor 30 as parallel data (e.g., 8-bit or 16-bit) via data port 24 and transmitted to primary data acquisition circuit 120 via data line 48, I/O expansion connector 40, and data transfer line 41.

Processor 130 determines a second fluid volume value corresponding to the computed digital flow rate value. Processor 130 compares the first and second fluid volume values to verify operation of the first and second fluid volume sensors 98A, 98B. In this regard, if the first and second fluid volume values have a difference exceeding a predetermined threshold, it is determined that at least one of the first and second fluid volume sensors 98A, 98B is faulty. Accordingly, appropriate corrective action can be taken by primary data acquisition system 120, and/or warning signals can be generated to alert an operator to the faulty sensing device.

Third fluid volume sensor 98C is preferably a flowmeter sensor. The flowmeter sensor provides a digital pulse signal to secondary data acquisition circuit 20 that is indicative of the flow rate of a fluid (i.e., a cleaning solution, such as a detergent solution) at a second location. The digital pulse signal passes through protection and conditioning circuit 86 and multiplexer 76 to input capture register 38. Processor 30 counts the received digital pulses indicative to determine a digital flow rate value. The computed digital flow rate value is read out of processor 30 as parallel data (e.g., 8-bit or 16-bit) via data port 24 and transmitted to primary data acquisition circuit 120 via data line 48, I/O expansion connector 40, and data transfer line 41.

Other modifications and alterations will occur to others upon their reading and understanding of the specification. It is intended that all such modifications and alterations be included insofar as they come within the scope of the invention as claimed or the equivalents thereof.

Having described the invention, the following is claimed:

1. A data acquisition system for monitoring of sensor data, comprising:
   (a) a primary data acquisition circuit for receiving data from at least a first sensing device indicative of a parameter associated with one of the following fluids: water, a cleaning solution or a disinfection solution, said primary data acquisition circuit including:
   first processing means for processing the data received from said first sensing device, and
   (b) a secondary data acquisition circuit for receiving data from at least a second sensing device indicative of said parameter associated with said fluid, said secondary data acquisition circuit including:
   second processing means for processing the data received from said second sensing device, and
   an analog-to-digital conversion means for converting analog data to digital data, said secondary data acquisition circuit electrically connected with said primary data acquisition circuit.

2. A data acquisition system according to claim 1, wherein said parameter associated with said fluid is one of the following: temperature, pressure or volume.

3. A data acquisition system according to claim 1, wherein said first sensing device is a first temperature sensor, and said second sensing device is a second temperature sensor.

4. A data acquisition system according to claim 3, wherein said first and second temperature sensors are resistance temperature detectors.

5. A data acquisition system according to claim 1, wherein said first sensing device is a first pressure sensor, and said second sensing device is a second pressure sensor.

6. A data acquisition system according to claim 5, wherein each said first and second pressure sensors includes a pressure transducer.

7. A data acquisition system according to claim 1, wherein said first sensing device is an air pressure sensor, and said second sensing device is said air pressure sensor.

8. A data acquisition system according to claim 1, wherein said analog-to-digital conversion means receives analog sensor data from said second sensing device, and converts said analog sensor data to digital sensor data.

9. A data acquisition system according to claim 1, wherein said second processing means assembles parallel data associated with said second sensing device, said parallel data received by said primary data acquisition circuit.

10. A data acquisition system according to claim 9, wherein first processing means includes means for comparing said parallel data from said secondary data acquisition circuit to the data received from said first sensing device.

11. A data acquisition system according to claim 10, wherein said primary data acquisition circuit includes a watchdog timer.

12. A data acquisition system for monitoring of sensor data, comprising:
(a) a primary data acquisition circuit for receiving data from a sensing device indicative of a parameter associated with one of the following fluids: water, a cleaning solution or a disinfection solution, said primary data acquisition circuit including:
first processing means for processing the data received from said sensing device, and
(b) a secondary data acquisition circuit for receiving the data from said sensing device, said secondary data acquisition circuit including:
second processing means for processing the data received from said sensing device, and
an analog-to-digital conversion means for converting analog data to digital data, said secondary data acquisition circuit electrically connected with said primary data acquisition circuit.

13. A data acquisition system according to claim 12, wherein said parameter associated with the fluid is one of the following: temperature, pressure or volume.

14. A data acquisition system according to claim 12, wherein said sensing device is one of the following: an air pressure sensor, a fluid pressure sensor or a fluid volume sensor.

15. A data acquisition system according to claim 14, wherein said fluid pressure sensor is a pressure transducer.

16. A data acquisition system according to claim 14, wherein said air pressure sensor is a pressure transducer.

17. A data acquisition system according to claim 12, wherein said analog-to-digital conversion means receives analog sensor data from said sensing device, and converts said analog sensor data to digital sensor data.

18. A data acquisition system according to claim 12, wherein said second processing means assembles parallel data associated with said sensing device, said parallel data received by said primary data acquisition circuit.

19. A data acquisition system according to claim 18, wherein said first processing means includes means for comparing said parallel data from said secondary data acquisition circuit to the data received from said sensing device.

* * * * *